US012699766B2

(12) United States Patent
Constable et al.

(10) Patent No.: US 12,699,766 B2
(45) Date of Patent: Aug. 4, 2026

(54) EFFICIENT EXCEPTION HANDLING IN TRUSTED EXECUTION ENVIRONMENTS

(71) Applicant: Intel Corporation, Santa Clara, CA (US)

(72) Inventors: Scott Constable, Portland, OR (US); Bin Xing, Hillsboro, OR (US); Yuan Xiao, Columbus, OH (US); Krystof Zmudzinski, Forest Grove, OR (US); Mona Vij, Hillsboro, OH (US); Mark Shanahan, Raleigh, NC (US); Francis McKeen, Portland, OR (US); Ittai Anati, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/561,412

(22) Filed: Dec. 23, 2021

(65) Prior Publication Data

US 2023/0205869 A1      Jun. 29, 2023

(51) Int. Cl.
| | |
|---|---|
| *G06F 21/53* | (2013.01) |
| *G06F 9/30* | (2018.01) |
| *G06F 9/46* | (2006.01) |

(52) U.S. Cl.
CPC .......... *G06F 21/53* (2013.01); *G06F 9/30105* (2013.01); *G06F 9/30145* (2013.01); *G06F 9/461* (2013.01)

(58) Field of Classification Search
CPC .................................. G06F 21/53; G06F 9/461
See application file for complete search history.

(56) References Cited

U.S. PATENT DOCUMENTS

| | | | |
|---|---|---|---|
| 5,043,878 A | 8/1991 | Yasushi | |
| 6,128,641 A * | 10/2000 | Fleck | ...................... G06F 9/462 |
| | | | 712/E9.032 |

(Continued)

FOREIGN PATENT DOCUMENTS

| | | |
|---|---|---|
| EP | 1242869 A1 | 9/2002 |

OTHER PUBLICATIONS

Victor Costan, Ilia Lebedev, and Srinivas Devadas. 2016. Sanctum: minimal hardware extensions for strong software isolation. In Proceedings of the 25th USENIX Conference on Security Symposium (SEC'16). Usenix Association, USA, 857-874. (Year: 2016).*

(Continued)

*Primary Examiner* — William R Korzuch
*Assistant Examiner* — Aditya Sriram
(74) *Attorney, Agent, or Firm* — Nicholson De Vos Webster & Elliott LLP

(57)          ABSTRACT

Systems, methods, and apparatuses relating efficient exception handling in trusted execution environments are described. In an embodiment, a hardware processor includes a register, a decoder, and execution circuitry. The register has a field to be set to enable an architecturally protected execution environment at one of a plurality of contexts for code in an architecturally protected enclave in memory. The decoder is to decode an instruction having a format including a field for an opcode, the opcode to indicate that the execution circuitry is to perform a context change. The execution circuitry is to perform one or more operations corresponding to the instruction, the one or more operations including changing, within the architecturally protected enclave, from a first context to a second context.

10 Claims, 11 Drawing Sheets

(56)           References Cited

U.S. PATENT DOCUMENTS

| | | | | |
|---|---|---|---|---|
| 6,728,962 | B1 * | 4/2004 | Chalmer | G06F 9/4843 |
| | | | | 712/228 |
| 6,751,737 | B1 | 6/2004 | Russell et al. | |
| 2002/0112203 | A1 * | 8/2002 | Andress | G06F 11/0712 |
| | | | | 714/48 |
| 2003/0014667 | A1 * | 1/2003 | Kolichtchak | G06F 21/52 |
| | | | | 726/4 |
| 2014/0337983 | A1 * | 11/2014 | Kang | G06F 21/78 |
| | | | | 726/26 |
| 2017/0090925 | A1 * | 3/2017 | O'Connor | G06F 11/30 |
| 2017/0185776 | A1 * | 6/2017 | Robinson | G06F 21/575 |

OTHER PUBLICATIONS

Victor Costan, Ilia Lebedev, and Srinivas Devadas. 2016. Sanctum: minimal hardware extensions for strong software isolation. In Proceedings of the 25th USENIX Conference on Security Symposium (SEC'16). Usenix Association, USA, 857-874. (Year: 2016).*

Arnautov et al., "SCONE: Secure Linux Containers with Intel SGX", Proceedings of the 12th USENIX Symposium on Operating Systems Design and Implementation (OSDI '16), Nov. 2-4, 2016, pp. 689-703 (17 pages).

Bulck et al., "SGX-Step: A Practical Attack Framework for Precise Enclave Execution Control", SysTEX'17: Proceedings of the 2nd Workshop on System Software for Trusted Execution, Oct. 2017, 6 pages.

Tsai et al., "Graphene-SGX: A Practical Library OS for Unmodified Applications on SGX", Proceedings of the 2017 USENIX Annual Technical Conference (USENIX ATC '17), Jul. 12-14, 2017, pp. 645-658 (15 pages).

European Search Report and Search Opinion, EP App. No. 22205958. 6, Mar. 2, 2023, 11 pages.

* cited by examiner

Method 200

Method 250

Enter TEE to run application in main context  252

Enable MODE  254

Encounter EEE  256

Exit TEE  258

Re-enter TEE in handler context  260

Jump to handler to apply mitigations  262

Copy/restore state  264

Invoke DECCSSA  266

Return to application  268

Continue execution with mitigations applied  270

Disable MODE  272

Exit enclave  274

EFFICIENT EXCEPTION HANDLING IN TRUSTED EXECUTION ENVIRONMENTS

TECHNICAL FIELD

The disclosure relates generally to information processing, and, more specifically, to trusted execution environments.

BACKGROUND

A processor, or set of processors, executes instructions from an instruction set, e.g., the instruction set architecture (ISA). The ISA is the part of the computer architecture related to programming, and generally may include the native data types, instructions, register architecture, addressing modes, memory architecture, interrupt and exception handling, and external input and output (I/O) architecture. It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIGS. 2A, 2B, and 2C illustrate a methods of handling asynchronous exits of the execution of code from an enclave that utilizes an enclave enter instruction, an enclave exit instruction, and a change context instruction according to embodiments;

DETAILED DESCRIPTION

Figure 1:
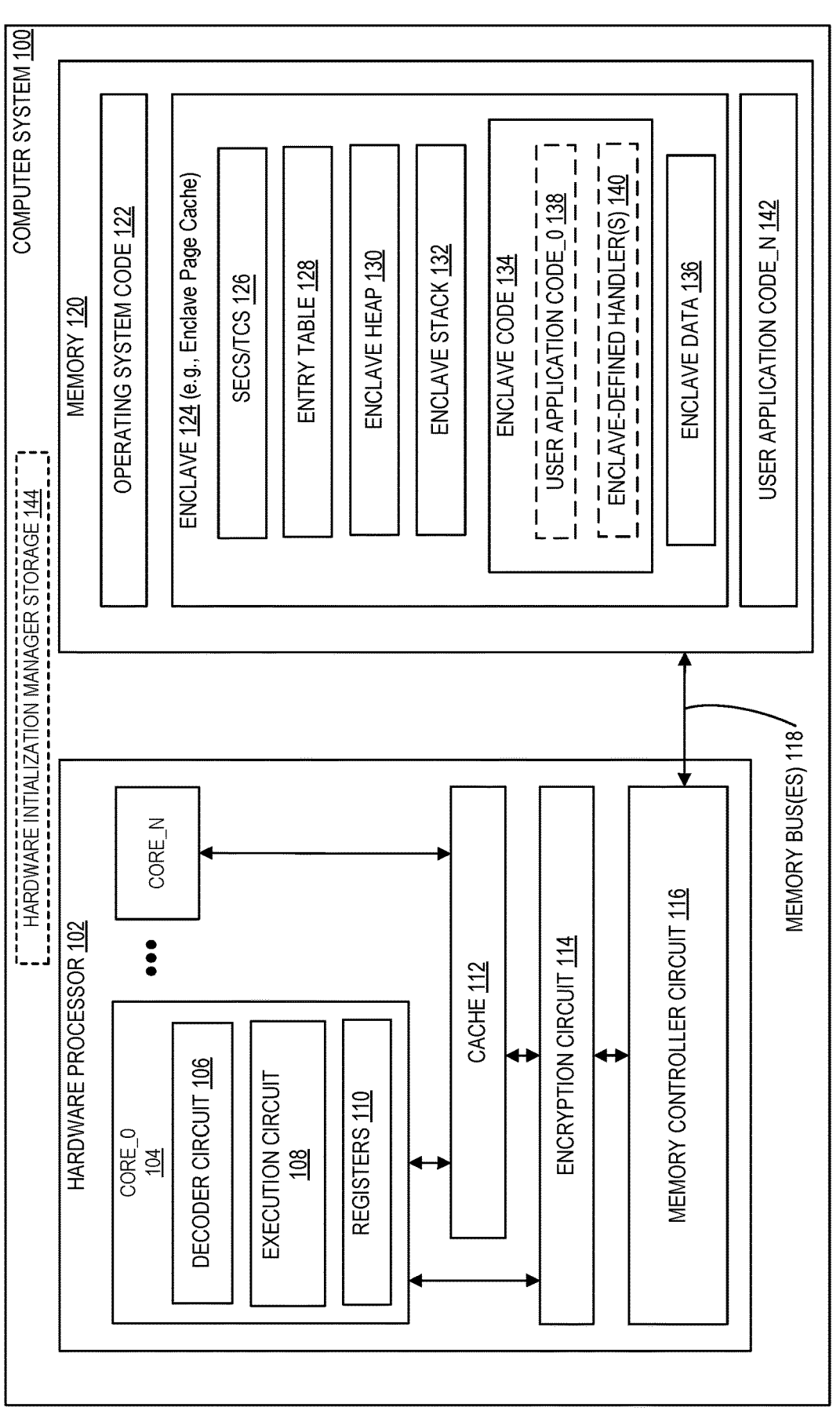
FIG. 1 illustrates a hardware processor coupled to a memory having an enclave according to embodiments.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used in this specification and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that what is described may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments to any particular type of storage location or number of bits or other elements within any particular storage location. For example, the term "bit" may be used to refer to a bit position within a register and/or data stored or to be stored in that bit position. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments to any particular logical convention, as any logical convention may be used within embodiments.

An information processing system, a central processing unit (CPU) or other processor within an information processing system, and/or an execution or processing core within a CPU or processor may support a trusted execution environment (TEE), for example, by implementing an architecturally protected execution environment. In some embodiments, a trusted execution environment may use one or more protected containers in memory, e.g., one or more architecturally protected enclaves. In this description, the term "enclave" may be used to refer to any execution environment that is trusted, protected, secure, etc. or any container within such an execution environment, and is not limited to a secure enclave as may be described below as an example.

In some embodiments, an instruction set architecture (ISA) or extension(s) of an ISA (e.g., Intel® Software Guard Extensions (Intel® SGX)) includes a set of instructions and mechanisms for memory accesses by a processor. For example, a first set of instruction extensions (e.g., SGX1) allows an application to instantiate a protected container (e.g., an enclave). In one embodiment, an enclave is a protected area in the application's address space, e.g., which provides confidentiality and integrity even in the presence of malware operating at a higher privilege level. In some embodiments, accesses to the enclave (e.g., its memory area) from any software not resident in the enclave are prevented. In embodiments, a second set of instruction extensions (e.g., SGX2) allows additional flexibility in runtime management of enclave resources and thread execution within an enclave.

TEEs are designed to provide confidentiality and integrity guarantees to facilitate secure code execution within an untrusted environment, such as a machine owned by a cloud service provider. Some TEEs—including Intel® SGX—are designed to run within a process, and therefore must be able to satisfy the same set of functional requirements as a non-TEE process. One such requirement is the ability to handle runtime exceptions and other asynchronous and synchronous events, such as exceptions, interrupts (e.g., external interrupts, non-maskable interrupts, system-management interrupts), traps, and virtual machine (VM) exits (as well as signals associated with such events) that may occur while executing inside an enclave. to protect the integrity and security of the enclave, some processors will exit the enclave (e.g., and enclave mode) before invoking the handler for such an event. For that reason, such events may be called enclave-exiting events (EEEs).

An example of an EEE is an exception triggered when software running within a TEE attempts to invoke certain instructions that may be illegal (e.g., CPUID or SYSCALL), unsupported or having an undefined opcode (e.g., triggering a #UD exception that the OS turns into a signal), etc. within enclaves.

In some embodiments, EEEs may also include signals associated with software and/or hardware triggered exceptions and/or events that privileged system software (e.g., an operating system (OS)) allows unprivileged user-level software (e.g., an application) to handle. For example, the OS may allow an application to register a user-space handler or function to be invoked by the OS if a specified event (e.g., a signal) is sent to the application.

When TEEs were first commoditized, the scope of software expected to run within a TEE was mostly limited to programs/libraries written specifically for that TEE. It would have been atypical for such software to encounter many exceptions, and therefore the architectural exception handling model for these TEEs was never optimized. However, in recent years the proliferation of containerization/native-compatibility frameworks such as Graphene-SGX, Gramine-SGX, and SCONE have dramatically broadened the scope of software that can run inside of a TEE to include software that was never intended to run inside of a TEE. This new software architecture requires significantly more emulation, dynamic memory management, etc. than TEEs such as Intel SGX were designed to support; hence the unoptimized exception handling behavior of commodity TEEs has become a bottleneck for performance.

Furthermore, recent developments on potential side-channel attacks have made it desirable to have a mechanism to detect and handle events that would cause a TEE to exit asynchronously, including both exceptions and interrupts.

An existing approach to handling an exception within a TEE may include entering, exiting, re-entering, exiting, and re-entering the TEE, as follows:

Enter the TEE in a particular context (call this the main context) to perform an operation. The context may consist of general-purpose register (GPR) values, machine specific register (MSR) values, vector register values, etc.

While performing the operation, the TEE software encounters an exception and exits. This process may be referred to as an asynchronous enclave exit (AEX) and is further described below.

The TEE is re-entered in a different context (call this the handler context) to handle the exception.

The exception handler can examine and modify the saved main context to diagnose and resolve the exception.

If the exception cannot be resolved, the TEE will shut down.

If the exception has been resolved, continue.

The TEE software running in the exception context exits.

The TEE is re-entered and the main context is restored from the context save area.

Execution may continue.

The AEX process may include saving the main context within a reserved area of the TEE to preserve its integrity and confidentiality. This reserved area may be called a save area, a context save area, a context state save area, or a state save area (SSA), and each context may have its own designated SSA. An asynchronous exit pointer (AEP) to the location of the eventing address may be pushed onto the stack, e.g., as the location to where control will return after executing a return or return from interrupt (e.g., IRET) instruction. An instruction to resume execution within the enclave (e.g., an ERESUME instruction, an SGX leaf function) may be executed from that point to reenter the enclave and resume execution from the interrupted point.

Repeated saving and restoring of TEE state may have a significant impact on performance; therefore, embodiments may provide efficient handling of exceptions, interrupts, signals, and other EEEs in TEEs for improved performance by reducing the number of TEE exits and entries associated with handling EEEs. Embodiments may include use of a new instruction to atomically switch to a different execution context within a TEE, without requiring software to exit and then re-enter the TEE to perform some context switches, thus expediting exception and some other EEE/AEX handling.

FIG. 1 illustrates a system 100 in which embodiments may be implemented. System 100 includes a hardware processor 102 coupled to a memory 120 having an enclave 124 according to embodiments. Hardware processor 102 may include any number of cores (e.g., core_0 only, core_0 and core_1, core_0 to core_N (where N is any positive integer), etc.), where a core may be any hardware processor or execution core, e.g., an instance of core 490 in FIG. 4B. Depicted core 104 includes a decoder circuit 106 to decode instructions into decoded instructions and an execution circuit 108 to execute instructions, e.g., to operate on data in registers 110 and/or memory 120.

The blocks shown in hardware processor 102 may be implemented in logic gates and/or any other type of circuitry, all or parts of which may be integrated into the circuitry of a processing device or any other apparatus in a computer or other information processing system. For example, blocks shown in FIG. 1 may correspond to and/or be implemented in any of core 490 in FIG. 4B, processor 500 in FIG. 5, processors 610/615 in FIG. 6, processors 770/780 in FIGS. 7 and 8, and/or application processor 910 in FIG. 9, each as described below.

Memory access (e.g., store or load) request may be generated by a core, e.g., a memory access request may be generated by execution circuit 108 of core 104 (e.g., caused by the execution of an instruction decoded by decoder circuit 106). In some embodiments, a memory access request is serviced by a cache, e.g., one or more levels of cache 112 in hardware processor 102. Additionally or alternatively (e.g., for a cache miss), a memory access request may be serviced by memory separate from a cache.

In some embodiments, computer system 100 includes an encryption circuit 114. In one embodiment, encryption circuit 114 of hardware processor 102 receives a memory access (e.g., store or load) request from one or more of its cores (e.g., from an address generation circuit of execution circuit 108). Encryption circuit may, e.g., for an input of a destination address and text to be encrypted (e.g., plaintext) (e.g., and a key), perform an encryption to generate a ciphertext (e.g., encrypted data). The ciphertext may then be stored in storage, e.g., in memory 120. An encryption circuit may perform a decryption operation, e.g., for a memory load request.

In some embodiments, computer system 100 includes a memory controller circuit. In one embodiment, memory controller circuit 116 of hardware processor 102 receives an address for a memory access request, e.g., and for a store request also receiving the payload data (e.g., ciphertext) to be stored at the address, and then performs the corresponding access into memory 120, e.g., via one or more memory buses 118. Computer system 100 may also include a coupling to secondary (e.g., external) memory (e.g., not directly accessible by a processor), for example, a disk (or solid state) drive.

In one embodiment, the hardware initialization manager (non-transitory) storage 144 stores hardware initialization manager firmware (e.g., or software). In one embodiment, the hardware initialization manager (non-transitory) storage 144 stores Basic Input/Output System (BIOS) firmware. In another embodiment, the hardware initialization manager (non-transitory) storage 144 stores Unified Extensible Firmware Interface (UEFI) firmware. In some embodiments (e.g., triggered by the power-on or reboot of a processor), computer system 100 (e.g., core 104) executes the hardware initialization manager firmware (e.g., or software) stored in hardware initialization manager (non-transitory) storage 144 to initialize the system 100 for operation, for example, to begin executing an operating system (OS), initialize and test the (e.g., hardware) components of system 100, and/or enabling enclave functionality (e.g., enclave instructions) (e.g., enabling by setting a corresponding field in a control register (e.g., model-specific register (MSR)) of registers 110, e.g., IA32_FEATURE_CONTROL MSR).

Memory 120 may store operating system (OS) code 122 (e.g., supervisor level code, e.g., current privilege level (CPL)=0). For example, with the current privilege level stored in a current privilege level (CPL) field of a code segment selector register of segment register of registers 110. Memory 120 may store user application code (e.g., user code_0 138 to user code_N 142) (e.g., user level code, e.g., CPL>0). However, in some embodiments it is desirable to store user application code (e.g., user code_0 138) within an enclave 124.

Enclave 124 may include a secure enclave control structure (SECS) (e.g., with one SECS per enclave) and/or thread control structure (TCS) 126 (e.g., one TCS for each thread), an entry table 128, an enclave heap 130, an enclave stack 132, enclave code 134 (e.g., user application code_0 138 (e.g., a user application) and/or an enclave defined handler 140), enclave data 136 (e.g., to store encrypted data used by user application code_0 128), or any one or combination thereof. In some embodiments, a SECS contains meta-data about the enclave which is used by the hardware and cannot be directly accessed by software. For example, a SECS including a field that stores the enclave build measurement value (e.g., MRENCLAVE). In one embodiment, that field is initialized by executing an enclave create (ECREATE) instruction, e.g., and updated by every enclave add (EADD) instruction and enclave extend (EEXTEND) instruction and/or locked by an enclave initialize (EINIT) instruction.

In some embodiments, every enclave contains one or more TCS structures, e.g., per thread of the enclave. For example, with a TCS containing meta-data used by the hardware to save and restore thread specific information when entering/exiting the enclave. In one embodiment, there is only one field (e.g., FLAGS) of a TCS that may be accessed by software (e.g., where this field can only be accessed by debug enclaves). In one embodiment, a flag bit (e.g., DBGOPTIN) allows a single step into the thread associated with the TCS. In some embodiments, a SECS is created when an ECREATE instruction is executed. In some embodiments, a TCS may be created using an EADD instruction and/or an (e.g., SGX2) instruction. In some embodiments, TCSs may be aligned on 4 KByte boundaries.

An enclave 124 may include one or more pages of an enclave page cache (EPC), e.g., where the EPC is the secure storage used to store enclave pages when they are a part of an executing enclave. In some embodiments, for an EPC page, hardware performs additional access control checks to restrict access to the page, e.g., after the current page access checks and translations are performed, the hardware checks that the EPC page is accessible to the program currently executing. In one embodiment, generally an EPC page is only accessed by the owner of the executing enclave or an instruction which is setting up an EPC page. In some embodiments, an EPC is divided into EPC pages, e.g., where an EPC page is 4 KB in size and always aligned on a 4 KB boundary. In some embodiments, pages in the EPC can either be valid or invalid, e.g., where every valid page in the EPC belongs to one enclave instance. In some embodiments, the EPC is managed by privileged software (e.g., OS or VMM). Some embodiments include an ISA extension or a set of instructions for adding and removing content to and from the EPC. The EPC may be configured by a hardware initialization manager at boot time. In one implementation in which EPC memory is part of system memory (e.g., dynamic random-access memory (DRAM)), the contents of the EPC are protected by encryption circuit 114.

Enclave instructions may include supervisor-level instructions and user-level instructions.

Examples of supervisor-level enclave instructions are an enclave add (EADD) instruction to add an EPC page to an enclave, an enclave block (EBLOCK) instruction to block an EPC page, an enclave create (ECREATE) instruction to create an enclave, a debug enclave read (EDBGRD) instruction to read data from a debug enclave by a debugger, a debug enclave write (EDBGWR) instruction to read data from a debug enclave by a debugger, an enclave extend (EEXTEND) instruction to extend an EPC page measurement, an enclave initialize (EINIT) instruction to initialize an enclave, an enclave load blocked (ELDB) instruction to load an EPC page in a blocked state, an enclave load unblocked (ELDU) instruction to load an EPC page in an unblocked state, an enclave PA (EPA) instruction to add an EPC page to create a version array, an enclave remove (EREMOVE) instruction to remove an EPC page from an enclave, an enclave track (ETRACK) instruction to activate enclave block (EBLOCK) checks, or an enclave write back/invalidate (EWB) instruction to write back and invalidate an EPC page.

Examples of user-level enclave instructions are an enclave enter (EENTER) instruction to enter an enclave, an enclave exit (EEXIT) instruction to exit an enclave, an enclave key (EGETKEY) instruction to create a cryptographic key, an enclave report (EREPORT) instruction to create a cryptographic report, or an enclave resume (ERESUME) instruction to re-enter an enclave.

Embodiments may include use of a new enclave instruction to atomically switch to a different execution context within a TEE, without requiring software to exit and then re-enter the TEE to perform some context switches, thus expediting exception and some other EEE/AEX handling. In this description, this instruction may be referred to as a change context instruction, CHGCTX, or a CHGCTX instruction. Any description using those terms may be implemented with one or more other instruction name(s), as embodiments may be implemented with any instruction name(s) (e.g., DECCSSA, EDECCSSA). Embodiments may include more than one such instruction (or leaves of an instruction) with more than one name (or distinguished by an operand, immediate, prefix, suffix, etc.), for example, a first instruction the operation of which causes a change to a context index (e.g., as described below) and a second instruction that does not.

In embodiments, a processor may perform one or more operations in response to a CHGCTX instruction (e.g., to execute or otherwise respond to a decoded CHGCTX instruction and/or micro-operations/micro-instructions decoded from a CHGCTX instruction). These operations may include one or more operations to save/store state of the context from which the CHGCTX instruction was invoked (e.g., the handler context in method 200) and one or more operations to load/restore state of the context to be entered (e.g., the main context in method 200).

Figure 2A:
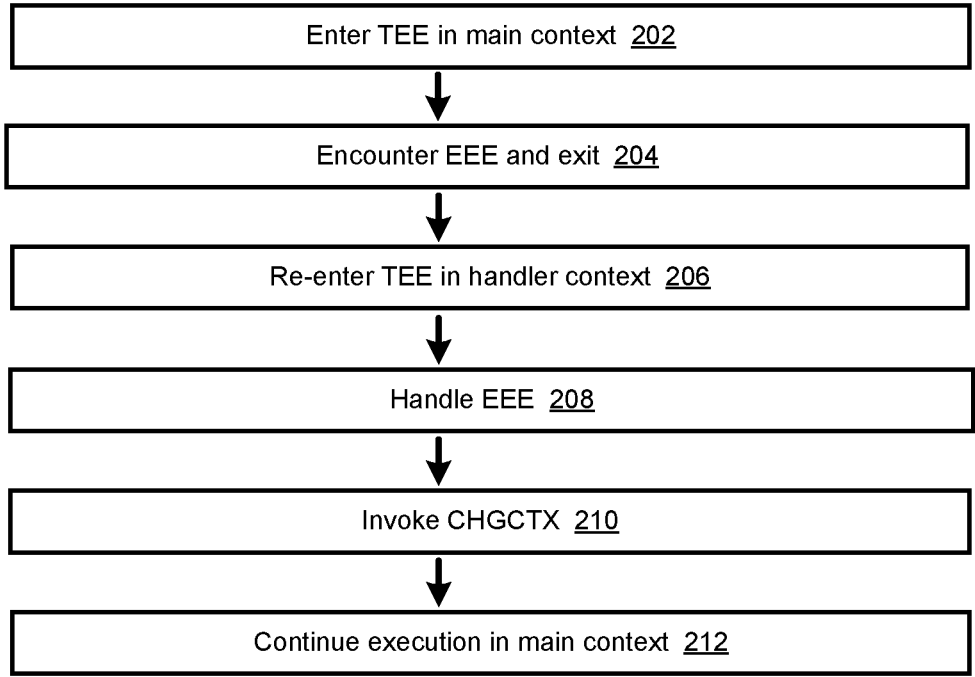

FIG. 2A illustrates aspects of embodiments in a method 200 for handling an exception (or other EEE) within a TEE, using a CHGCTX instruction. In method 200 (as well as the methods illustrated in FIGS. 2B and 2C), the TEE may be created and/or maintained by hardware/firmware/microcode of a processor (e.g., processor 102), in full or in part in response to the invocation of instructions by software.

Method 200 includes, in block 202, entering a TEE in the main context to perform an operation. The context may consist of general-purpose register (GPR) values, machine specific register (MSR) values, vector register values, etc.

In block 204, while performing the operation within the TEE, the TEE software encounters an exception and the TEE is exited (e.g., automatically by operation of the processor hardware/firmware/microcode (HW/FW/ucode)). The exit process includes saving the main context within the main context's SSA, as described below.

In block 206, the TEE is re-entered (e.g., in response to an EENTER or ERESUME instruction) in a different context (call this context the handler context) to handle the exception.

In block 208, the exception handler, executing within the TEE, examines and possibly modifies the main context to diagnose and resolve the exception, if possible. If the exception can be resolved, method 200 continues to block 210; if not, the TEE shuts down (not shown in FIG. 2).

In block 210, the exception handler invokes CHGCTX to exit the handler context and enter the main context, all within the TEE (i.e., without exiting the TEE).

In block 212, execution continues in the main context within the TEE.

An embodiment as shown in FIG. 2A may include only one TEE exit and one TEE re-entry (not including the initial entry in block 202), compared to two TEE exits and TEE re-entries (not including the initial entry) according to the existing approach described above.

To protect the secrecy of the enclave, in some embodiments an AEX or enclave exit (as in block 204) saves the state of certain registers within enclave memory (e.g., SSA) and then loads those registers with fixed values (e.g., called synthetic state). In some embodiments, the state save area holds the processor state at the time of an AEX. To allow handling events within the enclave and re-entering it after an AEX, in some embodiments the SSA is a stack of multiple SSA frames, e.g., as shown in FIG. 3.

Figure 3:
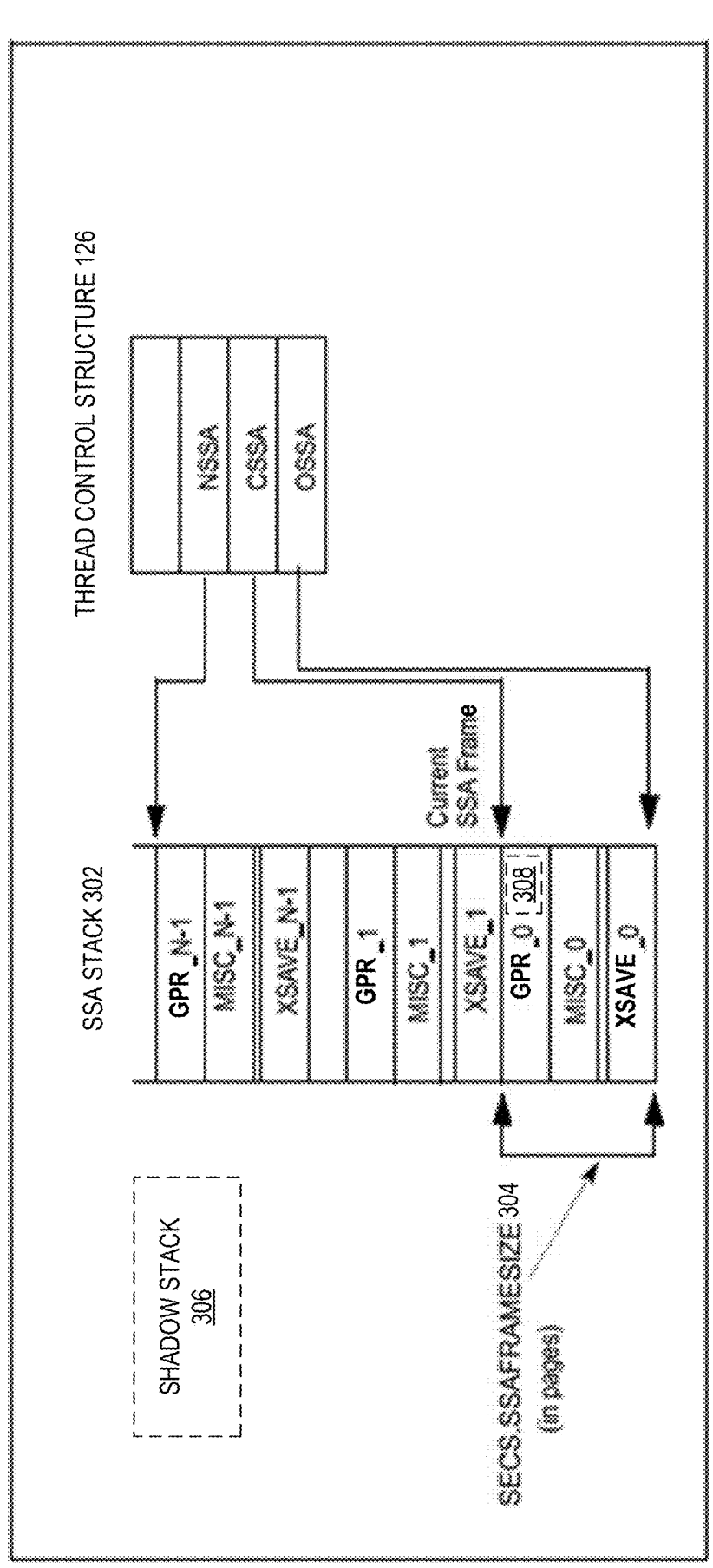
FIG. 3 illustrates a thread control structure and state save area stack according to embodiments.

For example, each enclave may be associated with an SECS and each executing thread in an enclave may be associated with a TCS (e.g., SECS/TCS 126 in FIG. 1). An SECS may have one or more fields, including a field to indicate a frame size for an SSA. A TCS may have one or more fields, including fields to indicate parameters of one or more SSAs for the associated thread. In an embodiment, the one or more SSAs may be saved in an SSA stack, and the SSA fields may include:

OSSA to store an offset, from the enclave's base address, of the base address of the SSA stack CSSA to store an index of a slot of the current SSA frame NSSA to store the number of slots available for SSA frames FIG. 3 illustrates a thread control structure 126 and state save area (SSA) stack 302 according to embodiments of the disclosure. In one embodiment, (optionally) a shadow stack 306 is included to store a copy of the SSA stack 302. In some embodiments, the size of a frame in the State Save Area (SECS.SSAFRAMESIZE 304) defines the number of (e.g., 4 KByte) pages in a single frame in the State Save Area. In some embodiments, the SSA frame size is large enough to hold the general-purpose register (GPR) state, the extended processor (XSAVE) state, and any miscellaneous state. In some embodiments, a secure enclave control structure (SECS) includes a base address of the enclave (SECS. BASEADDR), e.g., this defines the enclave's base linear address from which the offset to the base of the SSA stack is calculated. In some embodiments, number of state save area slots (TCS.NSSA) defines the total number of slots (frames) in the State Save Area stack. In some embodiments, the current state save area slot (TCS.CSSA) defines the slot to use on the next exit. In some embodiments, the State Save Area (TCS.OSSA) defines the offset of the base address of a set of State Save Area slots from the enclave's base address.

In some embodiments, when an AEX occurs (e.g., block 204 of method 200), hardware selects the SSA frame to use by examining TCS.CSSA, e.g., with the processor state saved into the SSA frame (e.g., and loaded with a synthetic state to avoid leaking secrets), certain pointers (e.g., a register stack pointer (RSP)) are restored to their values prior to enclave entry, and TCS.CSSA is incremented.

In some embodiments, an enclave entry happens only through specific enclave instructions (e.g., only EENTER or ERESUME) and/or an enclave exit happens only through specific enclave instructions or events (e.g., only EEXIT or an AEX).

In embodiments, a CHGCTX instruction may have format including a field to indicate the SSA to be used to provide state of the context to be entered (which may be called the destination context, e.g., the main context in method 200). The field, part or all of its content, and/or part or all of the content in a storage location indicated by the field's content may be referred to as an operand, argument, parameter, etc. of the CHGCTX instruction. For example, the field may be used to provide an address of or pointer to the SSA to provide state of the destination context, and/or, if context save areas are maintained within arrays, to provide an array index. In other embodiments, the SSA to be used to provide state of the destination context may be indicated according to another approach.

In embodiments, a CHGCTX instruction may have a format including an opcode field for an opcode, where the opcode may be decoded into one or more micro-instructions or micro-operations for execution, which may include one or more operations to perform a context change in response to the instruction. For example (as shown block 210 of in FIG. 2), the context change may be from a handler context to a main context and is performed within a TEE (i.e., without exiting the TEE).

A CHGCTX instruction format may also include one or more fields (such as the SSA field described above) for operands or to specify or indicate operands, arguments, or other parameters of or associated with the instruction. Operands, arguments, and/or other parameters may be associated with an instruction implicitly, directly, indirectly, or according to any other approach.

In some embodiments, a CHGCTX instruction may be a privileged or supervisor-level instruction. In some embodiments, a CHGCTX instruction may be an unprivileged or user-level instruction. In some embodiments, a CHGCTX instruction may be a leaf of another instruction (e.g., an SGX or SGX2 instruction). In some embodiments, a processor may perform a context change operation (e.g., as described herein as in response to a CHGCTX instruction), not or not only in response to an instruction having an opcode corresponding only to a context change operation, but in response to or in connection with one or more other events (e.g., a write to or setting of a specific bit or bits of a command, model-specific, machine-specific, or other register; changing an address/pointer to context state in registers/memory/storage such as through a write/store instruction/operation).

In various embodiments, the degree to which context is saved and/or restored by a CHGCTX instruction may vary; e.g., all processor context, some processor context, or no processor context may be saved and/or restored. In embodiments in which not all processor context is saved/restored by the operation of processor hardware (e.g., execution and/or load/store units), processor context may be saved/restored by software. For example, if the SSA is readable and/or writable by TEE software, then the TEE software may load the processor context from the SSA of the destination context, prior to invoking CHGCTX.

FIG. 2B illustrates aspects of embodiments in a method 220 for handling an exception (or other EEE) within an SGX secure enclave, using a CHGCTX instruction. In these embodiments, SSA frames (each corresponding to a single context) are stored within an array—one array per SGX enclave thread. Hence, as discussed above, CHGCTX may be implemented with an SSA index operand to indicate the destination SSA frame. However, to cover the expedited exception handling case described above, it suffices to simply have a CHGCTX implementation that decrements the current SSA (CSSA) index. Embodiments according to this approach may be referred to, for convenience, as DECCSSA, and a CHGCTX instruction according to this embodiment may be referred to as DECCSSA or a DECCSSA instruction. Commodity SGX software development kits (SDKs) and frameworks currently use a two-stage exception handling software flow that requires only two SSA frames: SSA[0] is used exclusively for the main context, SSA[1] is used exclusively by the exception handling flow. Therefore, DECCSSA may allow SGX enclave software to transition seamlessly from the exception handling context to the main context without having to exit and re-enter the enclave.

In method 220, block 222, enclave main flow begins in the main context, SSA[0]. In block 224, the enclave encounters an exception/interrupt, for example, at an instruction indicated by an instruction pointer (IP) in an IP register (RIP), e.g., RIP=0x1234. In block 226, the enclave exits asynchronously, which increments (e.g., automatically by operation of processor HW/FW/ucode) the CSSA index (e.g., to SSA[1]). In block 228, the enclave enters or re-enters (e.g., in response to an EENTER or ERESUME instruction) into the exception handling context, SSA[1], by operation of the software invoking the enter or resume instruction.

In block 230 (e.g., automatically by operation of HW/FW/ucode), the processor detects, at the enclave entry point, that the CSSA is greater than zero, and it jumps to an exception handler (in this example, a stage-1 handler in a two-stage exception handling scheme).

In block 232, the stage-1 handler ensures that the stage-2 handler will have enough stack, expanding the stack if necessary. In block 234, the stage-1 handler copies SSA[0] context, as necessary, into the stage-2 handler's stack, for example, GPRs, exit information, flags, etc. In embodiments, block 234 may include copying state from an extended state save (e.g., XSAVE) region, if any, from SSA[0] to the stack. In other embodiments, in which neither the exception handlers nor an attack mitigation flow (if any), touch extended states, the extended states (if any) may be loaded back with an extended state restore instruction (e.g., XRSTOR).

In block 236, the stage-1 handler invokes a DECCSSA instruction to switch the context to the main context, SSA[0]. In block 238, the stage-1 handler jumps to the stage-2 handler.

In block 240, the stage-2 handler handles the exception. In block 242, the stage-2 handler restores state, as necessary. In block 244, the stage-2 handler returns to the IP at which the exception occurred (e.g., RIP 0x1234).

In this embodiment, execution in response to a DECCSSA instruction (e.g., invoked in block 236) would only alter the context index (i.e., CSSA); enclave software would be responsible for restoring processor context (e.g., in block 234). In other embodiments, execution in response to a DECCSSA instruction may include one or more operations to automatically (e.g., by processor HW/FW/ucode) restore processor context.

Figure 2C:
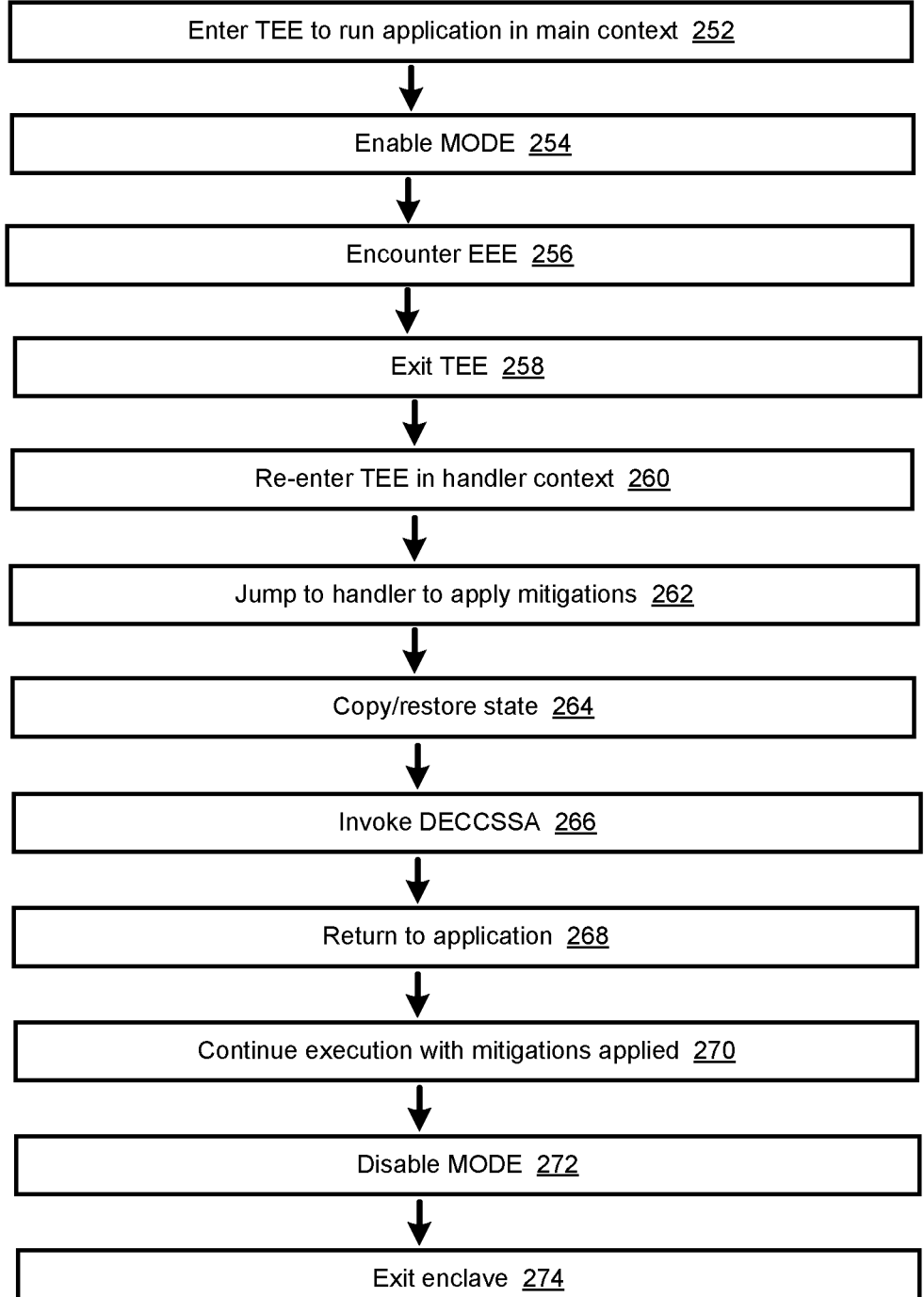
Figure 3:
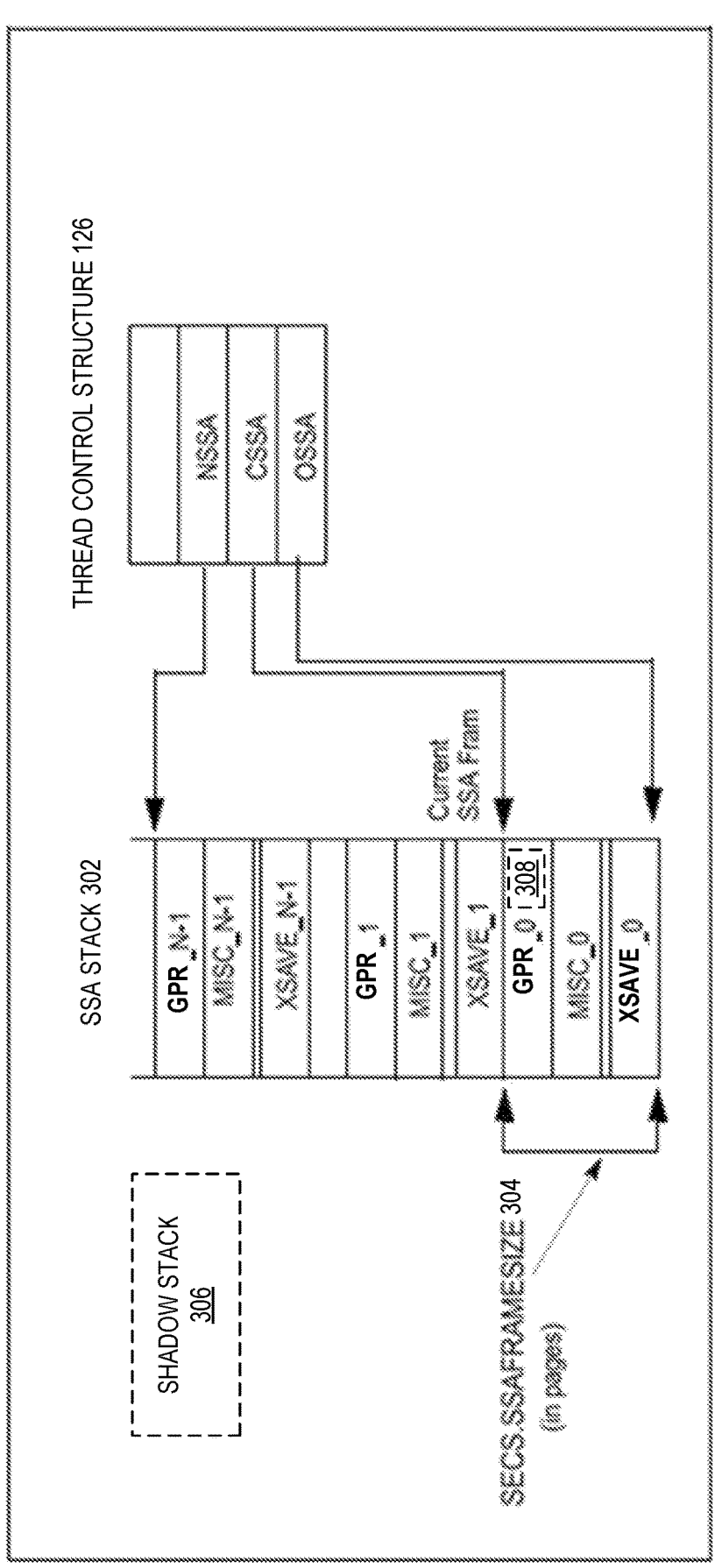

FIG. 2C illustrates aspects of embodiments in a method 250 for handling an exception (or other EEE) within a TEE, using a CHGCTX instruction, to mitigate potential side channel attacks. In these embodiments, a new mode (to be referred to as MODE) is introduced, in which an enclave resume instruction (e.g., ERESUME) is transformed into an enclave enter instruction (e.g., EENTER). When MODE is enabled, asynchronous enclave exits caused by an exception or interrupt raise an enclave software handler in a new context whenever the enclave is re-entered. Therefore, mitigations against malicious side-channel attacks may be applied. In these embodiments, use of a DECCSSA instruction provides a mechanism to quickly return to the main context (e.g., SSA[0]), thus avoiding significant overhead each time the enclave is interrupted or encounters an exception.

In method 250, block 252, enclave main flow begins in the main context, SSA[0]. In block 254, enclave software enables MODE. In block 256, the enclave encounters an exception/interrupt, for example, at RIP=0x1234. In block
258, the enclave exits asynchronously, which increments
(e.g., automatically by operation of processor HW/FW/
ucode) the CSSA index (e.g., to SSA[1]).

In block 260, the enclave enters or re-enters (e.g., in
response to an EENTER or ERESUME instruction), and,
automatically by operation of processor HW/FW/ucode,
MODE forces the enclave into the exception handling
context, SSA[1].

In block 262 (e.g., automatically by operation of HW/FW/
ucode), the processor detects, at the enclave entry point, that
the CSSA is greater than zero, and it jumps to an exception
handler to apply mitigations. In block 264, the exception
handler restores state, as necessary, from SSA[0]. In block
266, the exception handler invokes a DECCSSA instruction
to switch the context to the main context, SSA[0]. In block
268, the exception handler returns to the IP at which the
exception occurred (e.g., RIP 0x1234).

In block 270, enclave execution continues in the main
context, with mitigations applied. In block 272, the enclave
software disables MODE. In block 274, the enclave exits.

In some embodiments, a two-stage exception handler flow
(e.g., as shown in FIG. 2B) could also be augmented to apply
mitigations if desired (e.g., by an enclave developer).

EXAMPLE EMBODIMENTS

In embodiments, a hardware processor includes a register,
a decoder, and execution circuitry. The register has a field to
be set to enable an architecturally protected execution envi-
ronment for code in an architecturally protected enclave in
memory. The decoder is to decode an instruction having a
format including a field for an opcode, the opcode to indicate
that the execution circuitry is to perform a context change.
The execution circuitry is to perform one or more operations
corresponding to the instruction, the one or more operations
including changing, within the architecturally protected
enclave, from a first context to a second context.

Any such embodiments may include any or any combi-
nation of the following aspects. The register may have a field
to be set to enable an architecturally protected execution
environment at or in one of a plurality of contexts for code
in an architecturally protected enclave in memory. The first
context may be a context from which the single instruction
is invoked. The second context may be indicated by the
single instruction. The format may include a second field to
indicate the second context. The second field may be to
provide an address to an area of memory to provide state of
the second context. State of the second context may be to be
provided from an array of save areas. The format may
include a second field to provide an index of the array. The
one or more operations may also include changing an index
of the array. The one or more operations may also include
decrementing an index of the array. The hardware processor
may be to operate in a first mode and a second mode; in
response to an enclave exiting event in the second mode, the
hardware processor may cause a next enclave entry to be
into the first context; and in the first context, the hardware
processor may apply one or more mitigations against an
attack.

In embodiments, a method includes enabling an architec-
turally protected execution environment for code executing
or running in an architecturally protected enclave in memory
in response to a field of a register of a hardware processor
being set; decoding a single instruction having a format
including a first field for an opcode, the opcode to indicate
execution circuitry of the hardware processor is to perform a context change; and performing, by the execution circuitry,
one or more operations corresponding to the single instruc-
tion, the one or more operations including changing, within
the architecturally protected enclave, from a first context
(e.g., one of a plurality of contexts) to a second context (an
other of the plurality of contexts).

Any such embodiments may include any or any combi-
nation of the following aspects. The method may also
include, before decoding the single instruction entering the
architecturally protected enclave in the second context; and
exiting the architecturally protected enclave in response to
an enclave exiting event. Exiting the architecturally pro-
tected enclave may include saving the second context in a
save area. The method may also include, after exiting the
architecturally protected enclave, re-entering the architec-
turally protected enclave in the first context to handle the
enclave exiting event. The method may also include invok-
ing, by an exception handler in the first context, the single
instruction. The one or more operations may also include
restoring state of the second context. The method may also
include, before invoking the single instruction, restoring, by
software, state of the second context. State of the second
context may be provided from an array of save areas, and the
one or more operations may also include changing an index
of the array. The method may also include, before invoking
the single instruction, state fixup in response to the enclave
exiting event.

In embodiments, a system includes a memory and a
processor. The memory is to store an architecturally pro-
tected enclave. The processor includes a register, a decoder,
and execution circuitry. The register has a field to be set to
enable an architecturally protected execution environment
for code in an architecturally protected enclave. The decoder
is to decode an instruction having a format including a field
for an opcode, the opcode to indicate that the execution
circuitry is to perform a context change. The execution
circuitry is to perform one or more operations corresponding
to the instruction, the one or more operations including
changing, within the architecturally protected enclave, from
a first context to a second context.

Any such embodiments may include any or any combi-
nation of the following aspects. State of the second context
may be provided from a save area in the architecturally
protected enclave in the memory. The register may have a
field to be set to enable an architecturally protected execu-
tion environment at or in one of a plurality of contexts for
code in an architecturally protected enclave in memory. The
first context may be a context from which the single instruc-
tion is invoked. The second context may be indicated by the
single instruction. The format may include a second field to
indicate the second context. The second field may be to
provide an address to an area of memory to provide state of
the second context. State of the second context may be to be
provided from an array of save areas. The format may
include a second field to provide an index of the array. The
one or more operations may also include changing an index
of the array. The one or more operations may also include
decrementing an index of the array. The hardware processor
may be to operate in a first mode and a second mode; in
response to an enclave exiting event in the second mode, the
hardware processor may cause a next enclave entry to be
into the first context; and in the first context, the hardware
processor may apply one or more mitigations against an
attack.

In embodiments, an apparatus may include means for
performing any function disclosed herein. In embodiments,
an apparatus may include a data storage device that stores code that when executed by a hardware processor causes the hardware processor to perform any method disclosed herein. In embodiments, an apparatus may be as described in the detailed description. In embodiments, a method may be as described in the detailed description. In embodiments, a non-transitory machine-readable medium may store instructions that when executed by a machine causes the machine to perform a method including any method disclosed herein. Embodiments may include any details, features, etc. or combinations of details, features, etc. described in this specification.

Example Core Architectures, Processors, and Computer Architectures

The figures below detail example architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

Figures 4A, 4B:
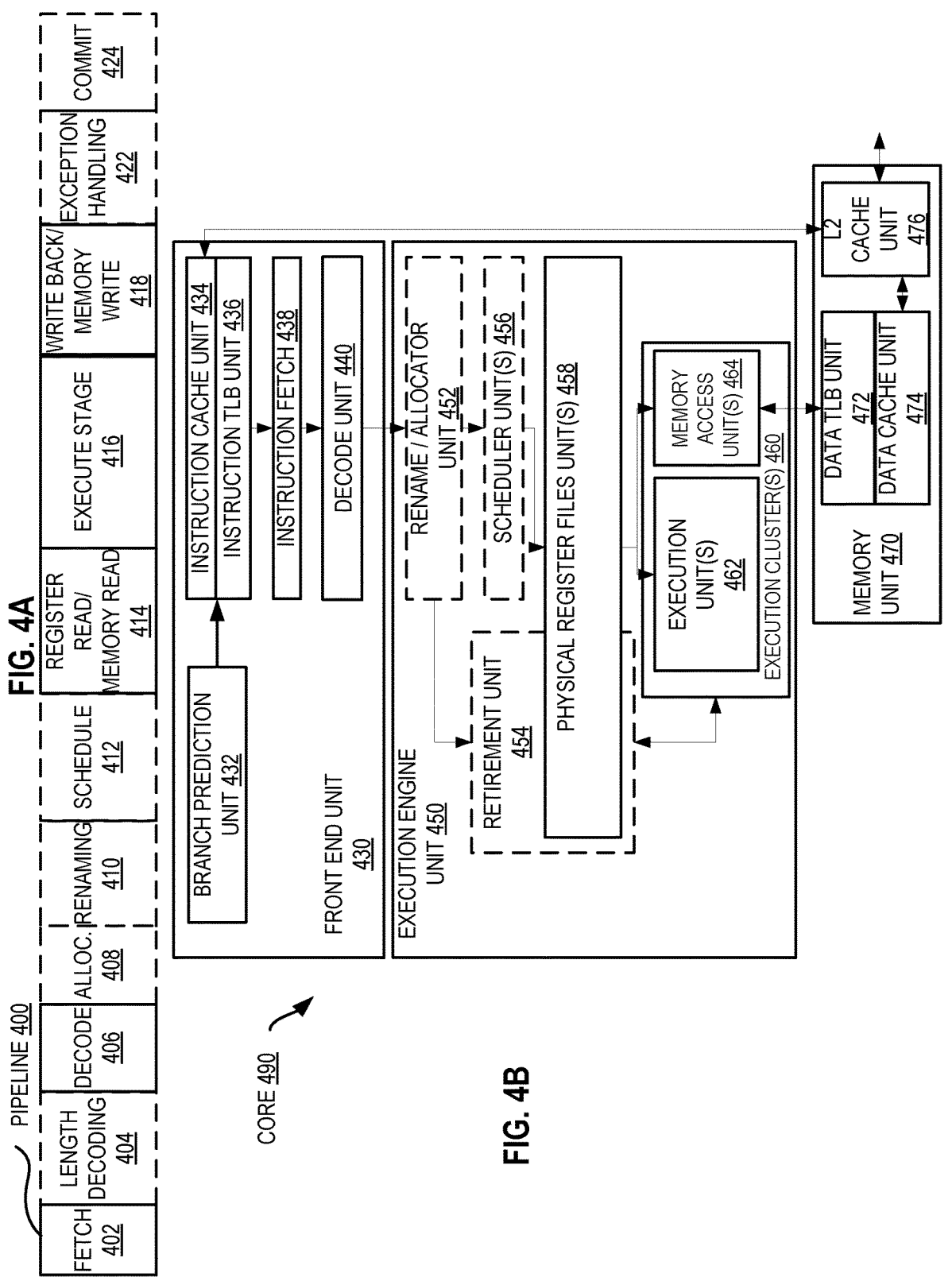
FIG. 4A is a block diagram illustrating both an example in-order pipeline and an example register renaming, out-of-order issue/execution pipeline according to embodiments.
FIG. 4B is a block diagram illustrating both an example embodiment of an in-order architecture core and an example register renaming, out-of-order issue/execution architecture core to be included in a processor according to embodiments.

FIG. 4A is a block diagram illustrating both an example in-order pipeline and an example register renaming, out-of-order issue/execution pipeline according to embodiments of the invention. FIG. 4B is a block diagram illustrating both an example embodiment of an in-order architecture core and an example register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 includes a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one example embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the example register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
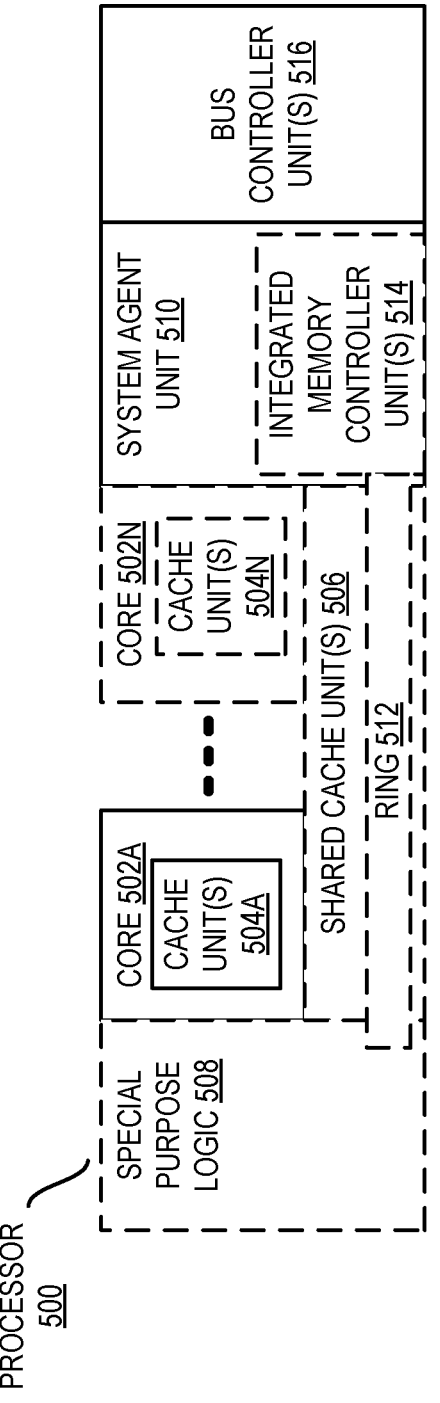
FIG. 5 is a block diagram of a processor that may have more than one core, may have an integrated memory controller, and may have integrated graphics according to embodiments.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Example Computer Architectures

FIGS. 6-9 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 6:
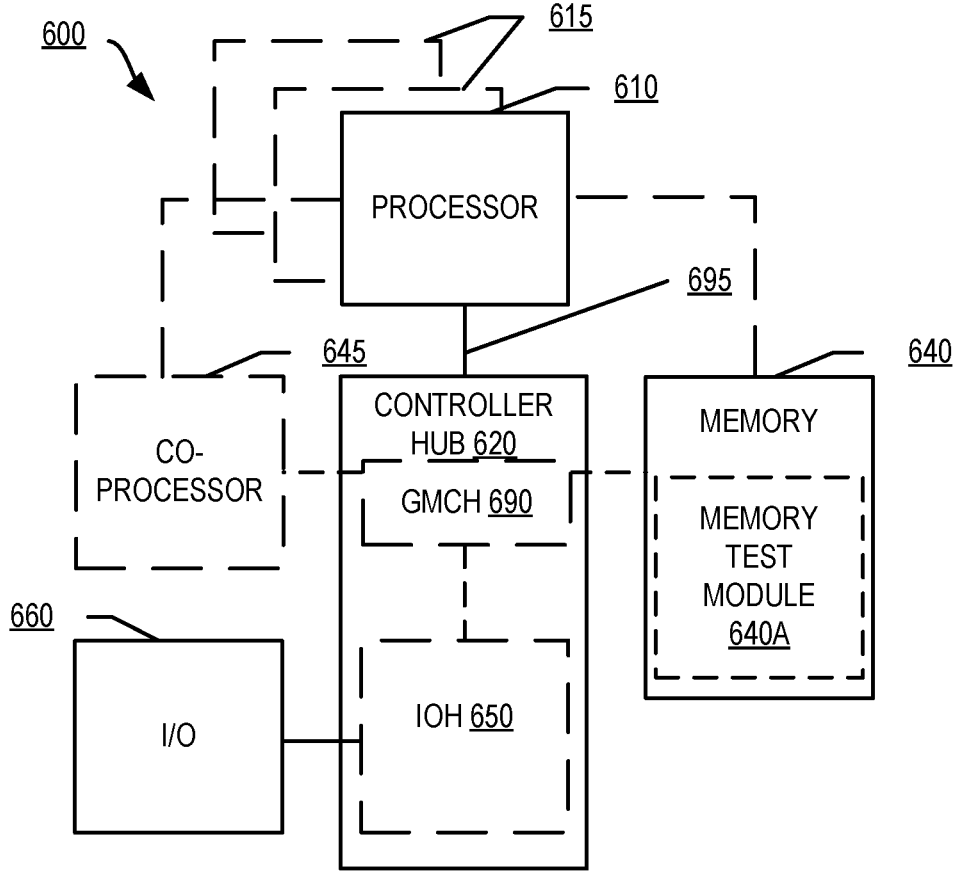
FIG. 6 is a block diagram of a system according to embodiments.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
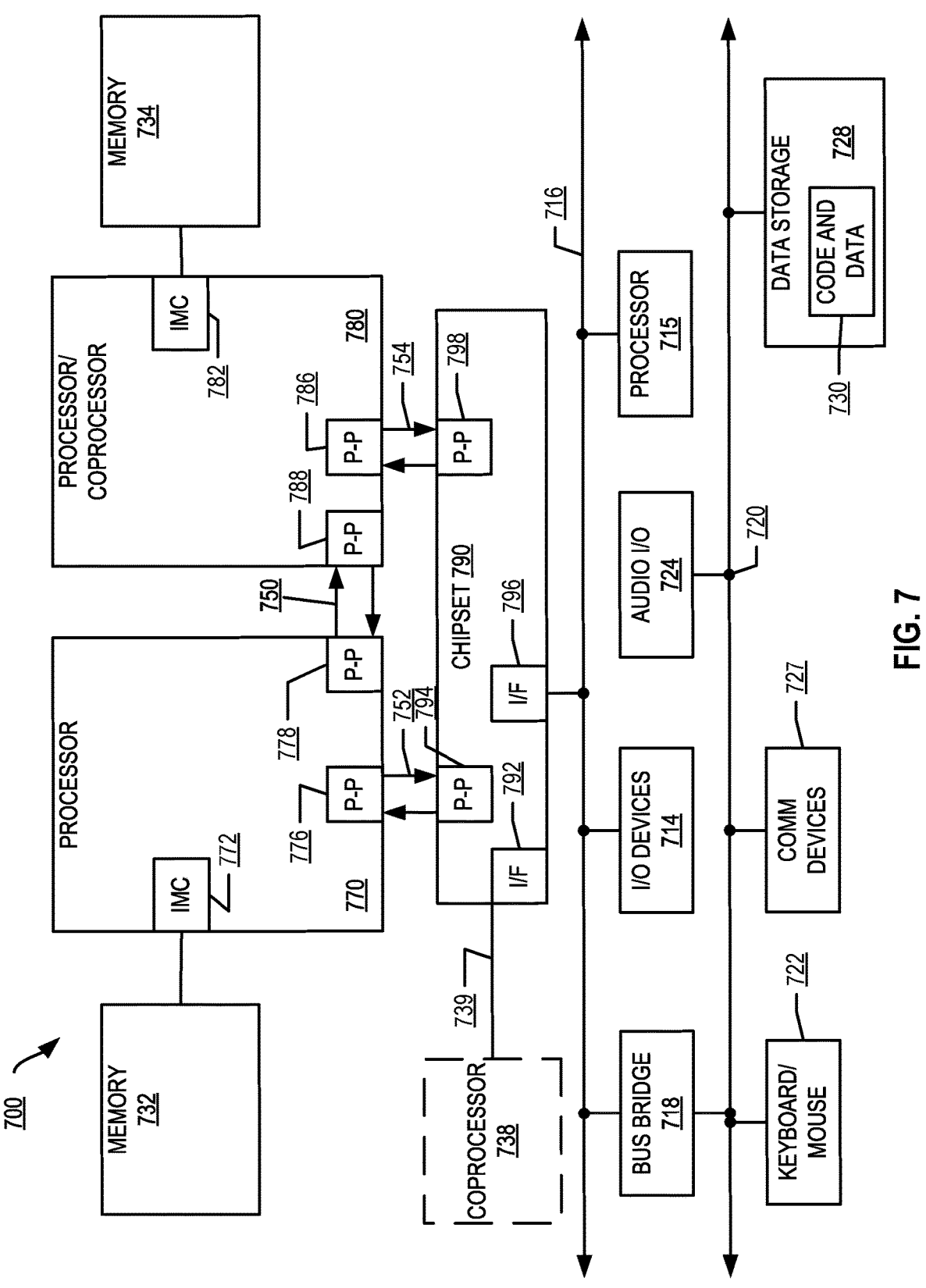
FIG. 7 is a block diagram of a system according to embodiments.

Referring now to FIG. 7, shown is a block diagram of a first more specific example system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
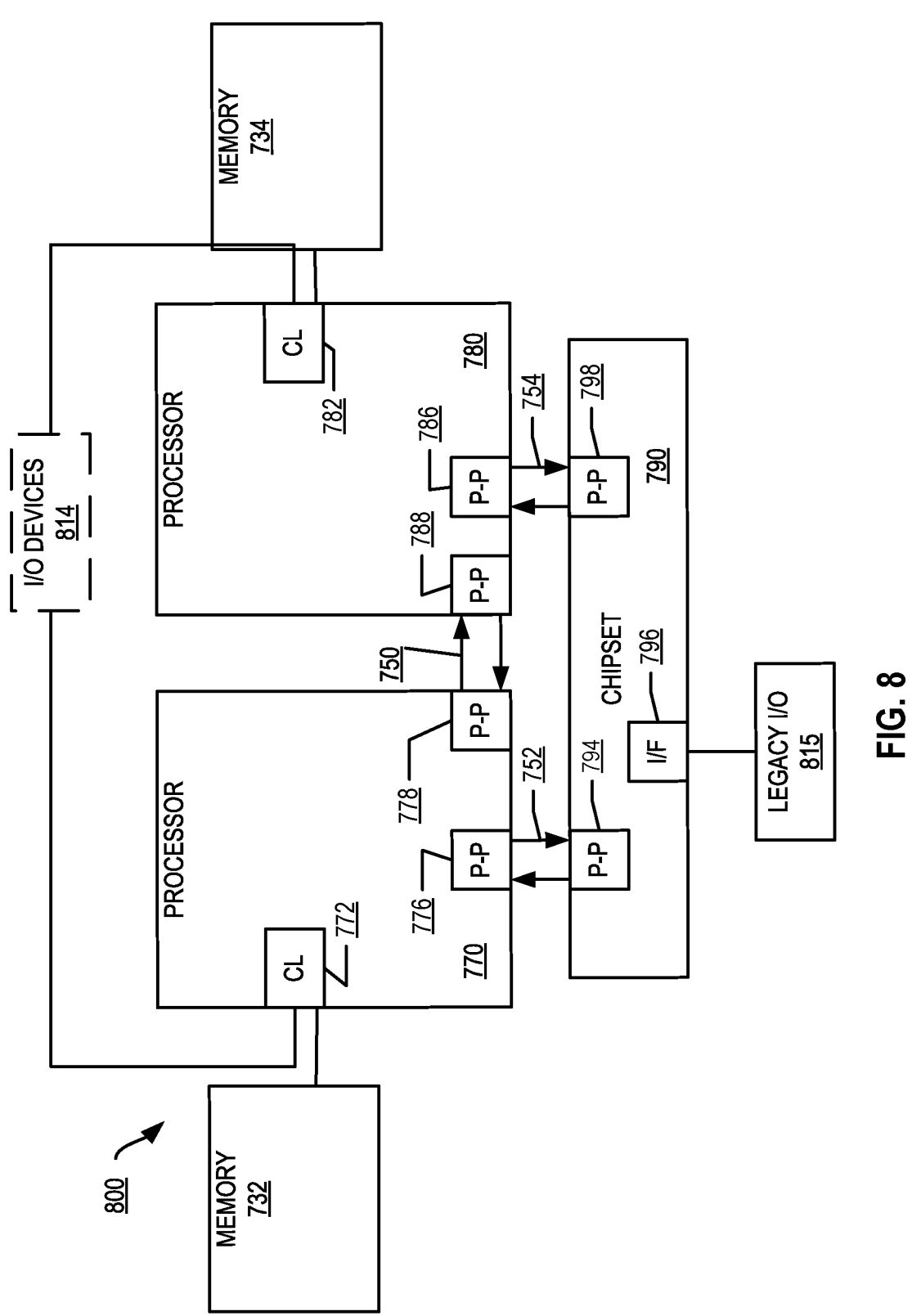
FIG. 8 is a block diagram of a system according to embodiments.

Referring now to FIG. 8, shown is a block diagram of a second more specific example system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
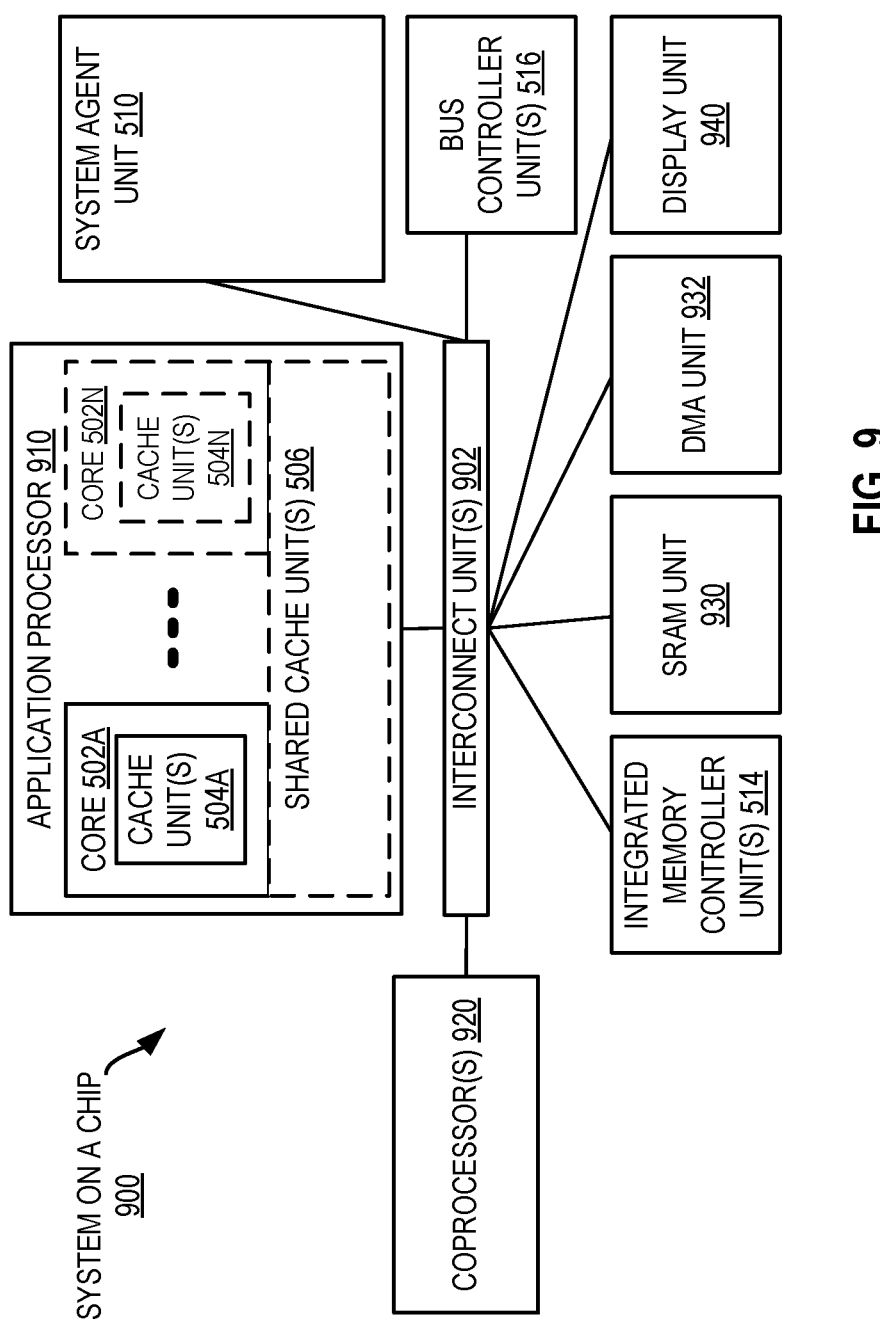
FIG. 9 is a block diagram of a system-on-a-chip according to embodiments.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; a static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems including at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations (known as "IP cores") may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In this specification, operations in flow diagrams may have been described with reference to example embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is for example (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A hardware processor comprising:

a register having a field set to enable an architecturally protected execution environment at one of a plurality of contexts for code in an architecturally protected enclave in memory;

a decoder to decode a single instruction having a format including a first field for an opcode, the opcode to indicate execution circuitry is to perform a context change; and the execution circuitry to perform one or more operations corresponding to the single instruction, the one or more operations including:

decrementing an index to an array of save areas, each save area corresponding to a different context, wherein the index is used to select a save area for a corresponding context in the array of save areas to store a state for the corresponding context in response to an enclave exiting event encountered by the architecturally protected enclave; and changing, within the architecturally protected enclave, from a first context to a second context, wherein the state of the second context is provided from the corresponding context in the array of save areas.

2. The hardware processor of claim 1, wherein:

the hardware processor is to operate in a first mode and a second mode;

in response to a second enclave exiting event in the second mode, the hardware processor is to cause a next enclave entry to be into the first context; and in the first context, the hardware processor is to apply one or more mitigations against an attack.

3. A method comprising:

enabling an architecturally protected execution environment for code executing in an architecturally protected enclave in memory in response to a field of a register of a hardware processor being set;

decoding a single instruction having a format including a first field for an opcode, the opcode to indicate execution circuitry of the hardware processor is to perform a context change;

encountering, by the architecturally protected enclave, an enclave exiting event; and performing, by the execution circuitry, one or more operations corresponding to the single instruction, the one or more operations including:

decrementing an index to an array of save areas, each save area corresponding to a different context, wherein the index is used to select a save area for a corresponding context in the array of save areas to store a state for the corresponding context in response to the enclave exiting event; and changing, within the architecturally protected enclave, from one context of a plurality of contexts to an other context of the plurality of contexts, wherein the state of the other context is provided from the corresponding context in the array of save areas.

4. The method of claim 3, further comprising, before decoding the single instruction:

entering the architecturally protected enclave in the other context; and exiting the architecturally protected enclave in response to the enclave exiting event.

5. The method of claim 4, wherein exiting the architecturally protected enclave includes saving the other context in the save area in the array of save areas.

6. The method of claim 5, further comprising, after exiting the architecturally protected enclave, re-entering the architecturally protected enclave in the one context to handle the enclave exiting event.

7. The method of claim 6, further comprising invoking, by an exception handler in the one context, the single instruction.

8. The method of claim 3, wherein the one or more operations also include restoring the state of the other context.

9. The method of claim 3, further comprising, before invoking the single instruction, restoring, by software, the state of the other context.

10. A system comprising:

a memory to store an architecturally protected enclave; and a processor including:

a register having a field set to enable an architecturally protected execution environment for code in the architecturally protected enclave;

a decoder to decode a single instruction having a format including a first field for an opcode, the opcode to indicate execution circuitry is to perform a context change; and the execution circuitry to perform one or more operations corresponding to the single instruction, the one or more operations including:

decrementing an index to an array of save areas, each save area corresponding to a different context, wherein the index is used to select a save area for a corresponding context in the array of save areas to store a state for the corresponding context in response to an enclave exiting event encountered by the architecturally protected enclave; and changing, within the architecturally protected enclave, from a first context to a second context, wherein the state of the second context is provided from the corresponding context of the save area, referenced by the index, in the architecturally protected enclave in the memory.

* * * * *